(12) United States Patent
Dietrich et al.

(10) Patent No.: US 9,114,712 B2
(45) Date of Patent: Aug. 25, 2015

(54) METHOD AND SYSTEM FOR DETERMINING STATE VARIABLES OF AN ELECTRIC MOTOR FOR DRIVING A MOTOR VEHICLE

(71) Applicant: Robert Bosch GmbH, Stuttgart (DE)

(72) Inventors: Simon Dietrich, Waiblingen (DE); Martin Braun, Neustetten-Wolfenhausen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/309,973

(22) Filed: Jun. 20, 2014

(65) Prior Publication Data

US 2015/0006003 A1     Jan. 1, 2015

(30) Foreign Application Priority Data

Jun. 26, 2013  (DE) .......................... 10 2013 212 177

(51) Int. Cl.
| | |
|---|---|
| B60L 9/00 | (2006.01) |
| B60L 11/00 | (2006.01) |
| G05D 1/00 | (2006.01) |
| G05D 3/00 | (2006.01) |
| G06F 7/00 | (2006.01) |
| G06F 17/00 | (2006.01) |
| B60L 3/12 | (2006.01) |
| B60L 11/14 | (2006.01) |

(52) U.S. Cl.
CPC . B60L 3/12 (2013.01); B60L 11/14 (2013.01); B60L 2240/14 (2013.01); B60L 2240/421 (2013.01); B60L 2240/423 (2013.01); B60L 2240/441 (2013.01); B60L 2240/461 (2013.01); B60L 2240/486 (2013.01); Y02T 10/7258 (2013.01)

(58) Field of Classification Search
CPC .................................. B60L 3/12; B60L 11/14
USPC ............................................................ 701/22
See application file for complete search history.

(56) References Cited

U.S. PATENT DOCUMENTS

| | | | |
|---|---|---|---|
| 7,002,318 | B1 | 2/2006 | Schulz et al. |
| 2004/0046519 | A1 | 3/2004 | Leonardi et al. |
| 2010/0156333 | A1 | 6/2010 | Chen et al. |

FOREIGN PATENT DOCUMENTS

EP          2555417          2/2013

*Primary Examiner* — Maceeh Anwari
(74) *Attorney, Agent, or Firm* — Michael Best & Friedrich LLP

(57) ABSTRACT

A method for determining state variables of an electric motor for driving a motor vehicle, comprising the procedural steps: measuring (102, 104) data (103, 105) which comprise information about a current state of vehicle components (10, 12, 30, 40); converting (110) the measured data (103, 105) into data (111) related to the electric motor (10) using a vehicle model of the motor vehicle (1); evaluating (120) the data (111) related to the electric motor (10) using a machine model of the electric motor (10) for determining at least one first state variable (121) of the electric motor (10); determining (130) at least one second state variable (131) of the electric motor (10) using a sensorless method; comparing and assessing for plausibility (140) the at least one first and the at least one second state variable (121, 131).

10 Claims, 4 Drawing Sheets

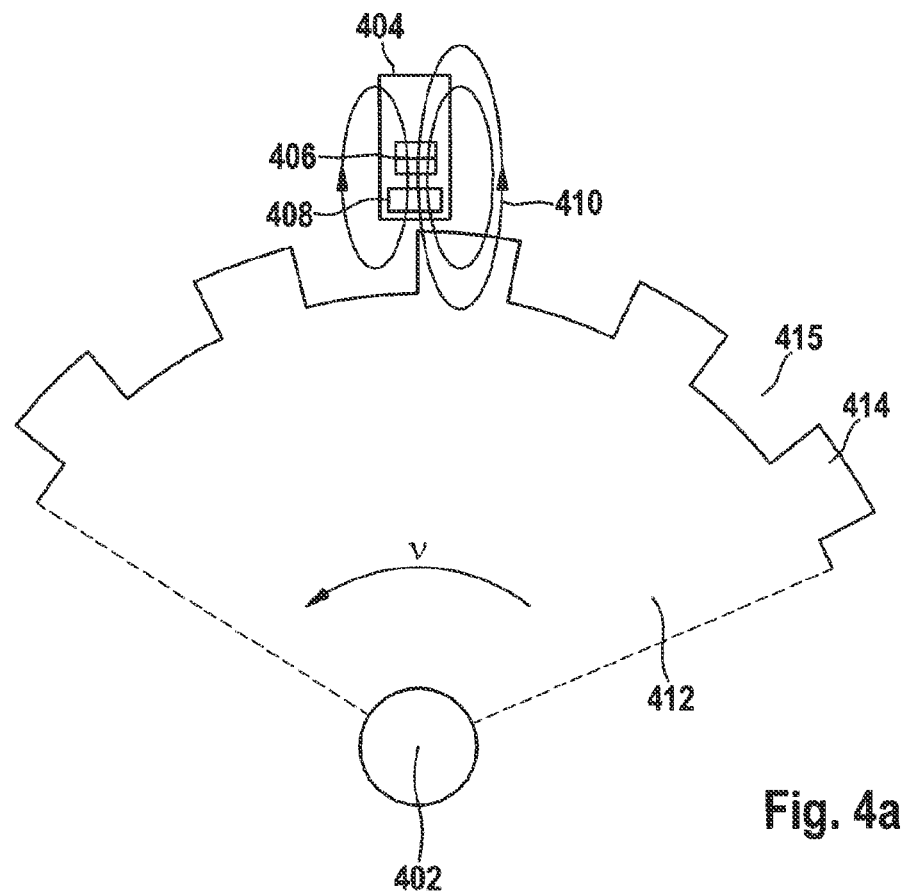
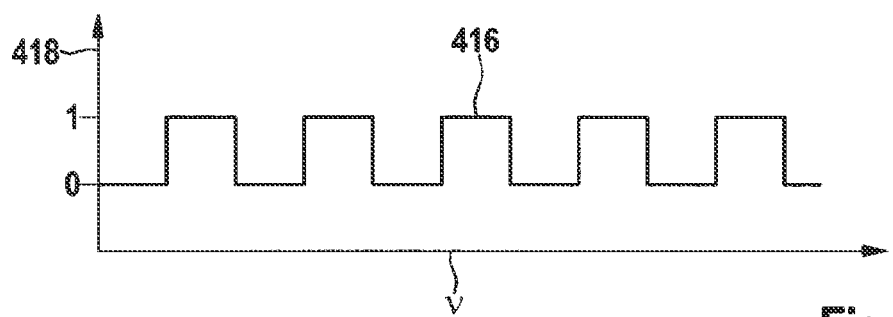
Fig. 4a
Fig. 4b

METHOD AND SYSTEM FOR DETERMINING STATE VARIABLES OF AN ELECTRIC MOTOR FOR DRIVING A MOTOR VEHICLE

BACKGROUND OF THE INVENTION

The present invention relates to a method and a system for determining state variables of an electric motor for driving a motor vehicle.

The knowledge of the rotor angle of the electric motor can be necessary for controlling rotary field motors or electric motors in order to be able to exactly set a required torque. In order to ascertain the rotor position, i.e. the rotor angle, a sensor is typically mounted on the rotor of the electric motor, which detects the rotor position. Alternatively, the rotor angle can be acquired by means of sensorless methods. Sensorless methods are methods which run without the use of a pattern converter, which is also referred to as a pattern generator or simply generator.

In the European patent EP 2555417 A1 a method for determining an absolute rotor angle with the aid of a wheel sensor is described, wherein an initial angle of the rotor of an electric motor is determined by means of a pole position identification.

SUMMARY OF THE INVENTION

The present invention discloses a method having the features of the invention and a system having the features of the invention.

Provision is accordingly made for a method for determining state variables of an electric motor for driving a motor vehicle, comprising the procedural steps: measuring of data which comprise items of information about a current state of vehicle components; converting the measured values into data related to the electric motor using a vehicle model of the motor vehicle; evaluating the data related to the electric motor using a machine model of the electric motor for determining at least one first state variable of the electric motor; determining at least one second state variable of the electric motor using a sensorless method; comparing and assessing the plausibility of the at least one first and the at least one second state variable; and calculating a state variable correction value of the electric motor using a weighted averaging of the at least one first and the at least one second state variables.

In addition, provision is made for a system for determining state variables of an electric motor for driving a motor vehicle, comprising internal sensors within the electric motor and/or comprising vehicle sensors disposed on the electric motor and/or on vehicle components in the vehicle, said vehicle sensors being designed to measure data which comprise information about a current state of the electric motor and/or of the aforementioned vehicle components. The system also comprises an electric motor control device disposed in the vehicle which is designed to control the electric motor, to convert the measured data into data related to the electric motor using a vehicle model of the motor vehicle, to evaluate the data related to the electric motor using a machine model of the electric motor for determining at least one first state variable of the electric motor, to determine at least one second state variable of the electric motor using a sensorless method, to compare and assess the plausibility of the at least one first and the at least one second state variable and to calculate a state variable correction value of the electric motor using a weighted averaging of the at least one first and the at least one second state variables.

The insight underlying the present invention is that a plurality of vehicle sensors, for example within the framework of a driving dynamics control system, is arranged in a motor vehicle, which sensors can be used to support and assess the plausibility of sensorless methods. This enables an improved accuracy, for example of the closed-loop and/or open-loop control of the electric motor of the vehicle to be achieved. In addition, relatively expensive pattern converters or generators can be entirely or partially replaced by sensorless methods that are correspondingly supported and checked for plausibility.

The separate setup and use of a vehicle model of the motor vehicle as well as a machine model of the electric motor can enable the vehicle model and the machine model to be separately set up and optimized.

According to a preferred modification to the inventive method, the items of information regarding the current state of the vehicle components and comprising the measured data include a rotational speed, a rotor angle and/or an acceleration of an axle. The vehicle model of the motor vehicle which can be used when converting the measured data into data related to the electric motor can comprise transformation information concerning a transformation of the rotational speed of the axle of the vehicle into a rotational speed of an axle of the electric motor and/or transformation information concerning a transformation of a rotor angle of the vehicle axle into a rotor angle of the electric motor. While using said transformation information when converting the measured data, a rotational speed of the axle of the vehicle can be converted into a rotational speed of the axle of the electric motor and/or a rotor angle of the axle of the vehicle can be converted into a rotor angle of the electric motor.

According to a further preferred modification, the at least one first state variable, the at least one second state variable and the state variable correction value each comprise a rotor angle of the electric motor. The rotor angle relevant for closed-loop and open-loop control systems can thus be determined with a great degree of accuracy and assessed for plausibility.

According to a further preferred modification, the at least one first state variable, the at least one second state variable and the state variable correction value respectively comprise a rotational speed of the electric motor. When using a three-phase asynchronous machine as the electric motor, a relative rotor position derived from the rotational speed of the electric motor can be sufficient for the control of the electric motor. In this case, a pole position identification of the electric motor can, for example, be omitted.

According to a further preferred modification, the at least one first state variable, the at least one second state variable and the state variable correction value each comprise a slip frequency of the electric motor.

According to a further preferred modification, the evaluation of the data related to the electric motor takes place using phase voltages and phase currents ascertained in a procedural step. Said phase voltages and currents are relatively easy to acquire and can be used to support the evaluation and assess the plausibility thereof.

According to a further preferred modification, the sensorless method using the determined state variable correction value is supported and assessed for plausibility when determining the at least one second state variable. Relatively cost effective sensorless methods can thus be used instead of elaborate and expensive sensor-supported methods.

According to a further modification, the evaluation of the data related to the electric motor is supported and assessed for plausibility using the determined state variable correction value.

According to a further preferred modification, data which at least comprise the state variable correction value are displayed, for example to a motor vehicle driver or to a person performing a test on the vehicle. Deviations from the first and second state variable and from the state variable correction value can be displayed one below the other.

According to a preferred embodiment of the system according to the invention, the vehicle sensors are designed in the inventive system to measure a rotational speed, a rotor angle and/or an acceleration of an axle of the vehicle. The electric motor control device can be designed in such a way that the vehicle model of the motor vehicle, which is used when converting the measured data into data related to the electric motor, comprises transformation information concerning a transformation of the rotational speed of an axle of the vehicle into a rotational speed of an axle of the electric motor and/or transformation information concerning a transformation of a rotor angle of the axle of the vehicle into a rotor angle of the electric motor. The electric motor control device can further be designed to convert a rotational speed of the axle of the vehicle into a rotational speed of the axle of the electric motor and/or a rotor angle of the axle of the vehicle into a rotor angle of the electric motor when converting the measured data.

BRIEF DESCRIPTION OF THE DRAWINGS

The present invention is explained below in detail with the aid of the exemplary embodiments shown in the schematic figures of the drawings. In the drawings:

FIG. 4a shows a schematic depiction of a device for measuring a rotational speed of an electric motor, which speed can be used in the procedural step 102; and FIG. 4b shows a graph which describes a datum measured using the device in FIG. 3a.

Identical or functionally identical elements and devices—provided nothing else is specified—are denoted with the same reference signs.

DETAILED DESCRIPTION

Figure 1:
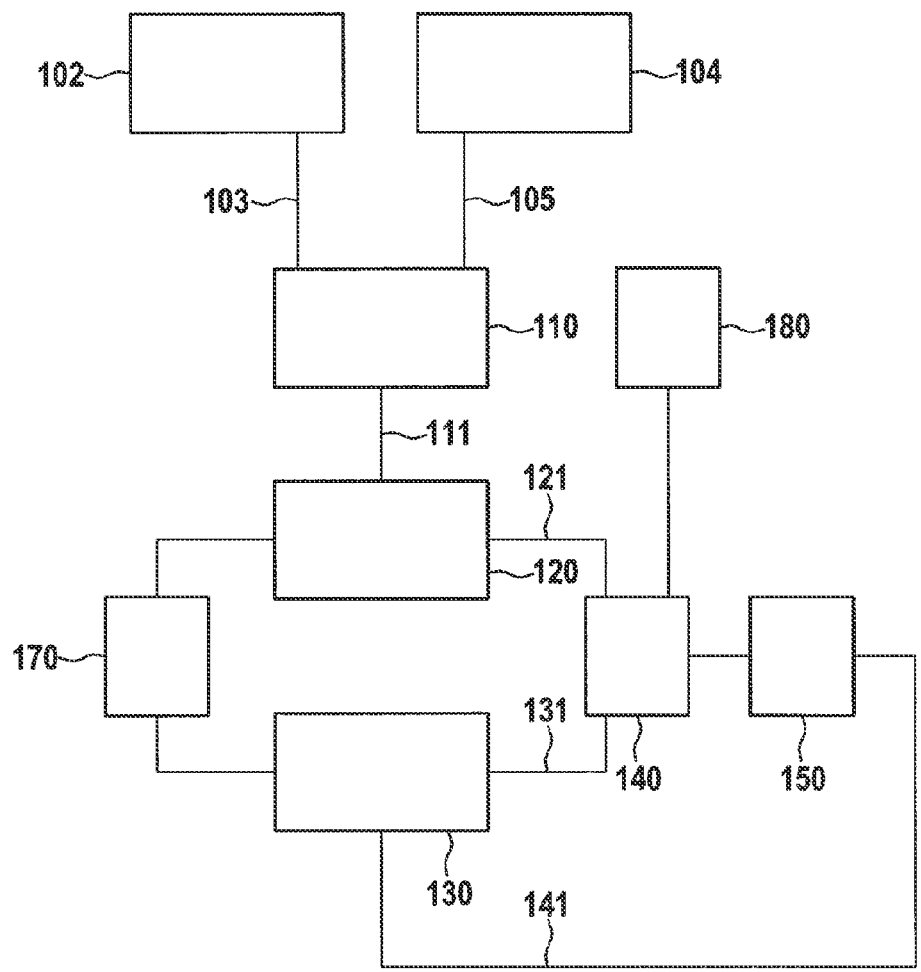
FIG. 1 shows a method for determining state variables of an electric motor for driving a motor vehicle pursuant to a first embodiment of the present invention.

FIG. 1 shows a method for determining state variables of an electric motor for driving a motor vehicle according to a first embodiment of the present invention. The method is also described with reference to the reference signs of the subsequent FIG. 4.

According to FIG. 1, internal data 103 within the electric motor are measured by sensors 11 within the electric motor in a procedural step 102, said data comprising, for example, items of information about a rotor position. Sensors 11 within the electric motor are sensors which are mounted directly to the electric motor 10 or integrated in the same, for example a position sensor, or also only rudimentary sensors instead of a resolver.

Figure 3:
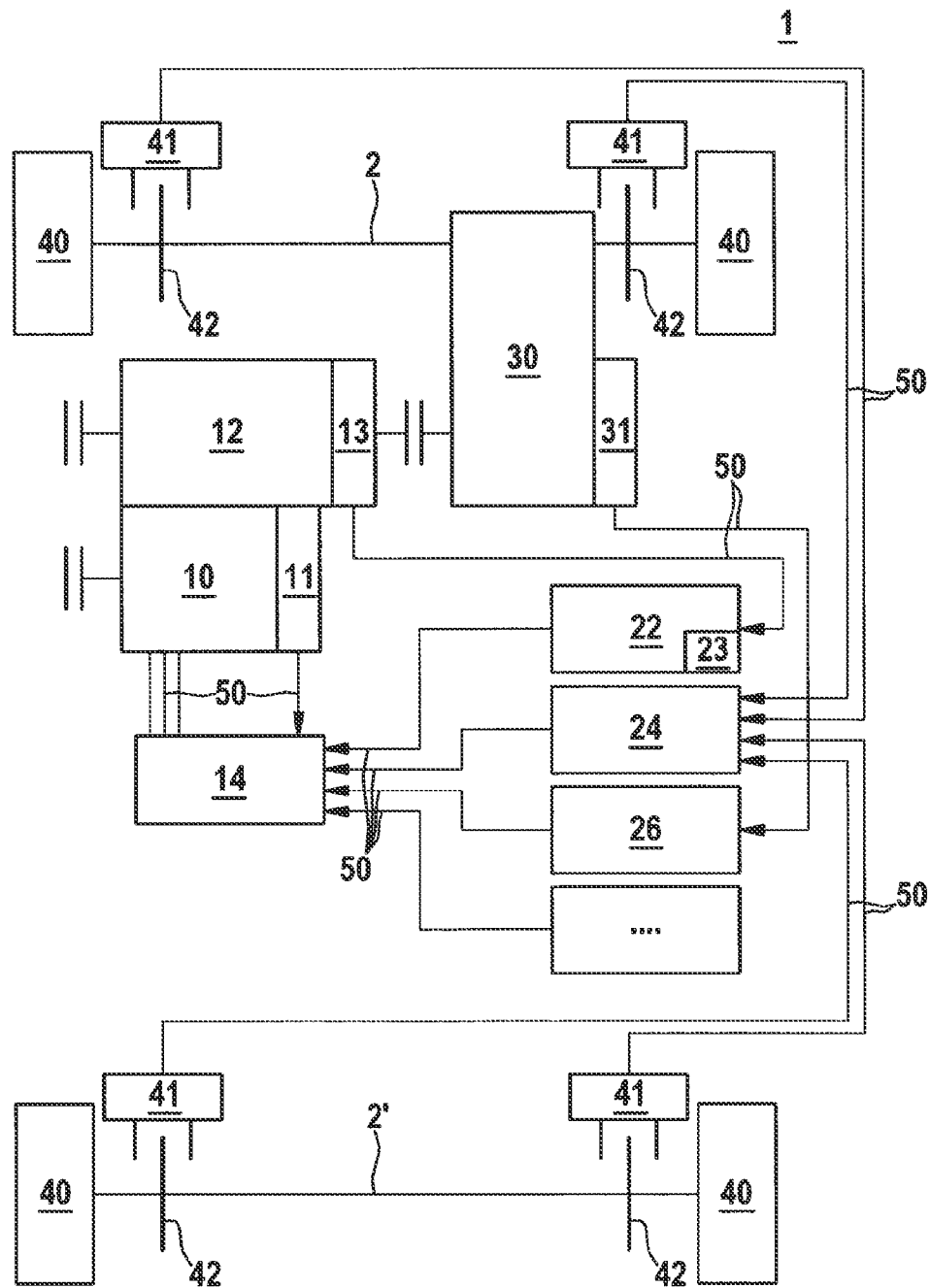
FIG. 3 shows a system according to the invention for determining state variables of an electric motor for driving a motor vehicle according to a third embodiment of the present invention.

In a further procedural step 104, vehicle-sensor measured data 105 are measured by vehicle sensors 13, 23, 31, 41, 42 (see FIG. 3). Such vehicle sensors can be for instance wheel and/or acceleration sensors 41, 42, for example in EV applications or hybrid concepts comprising electric motors 10 decoupled from a combustion engine 12, for example comprising an electric rear axle 2 (FIG. 3). In hybrid vehicles, in which the electric motor 10 is rigidly coupled to the combustion engine 12, position and rotational speed sensors 13 of the combustion engine 12 or position and rotational speed sensors 31 of a transmission 30 can, for example, additionally be used. The measured data acquired by the vehicle sensors in procedural step 104 can, for example, comprise measured data with regard to a wheel rotational speed. The data 105 measured by the vehicle sensors can be transmitted via an internal data network 50 within the vehicle. FIG. 3 shows an exemplary depiction of signal flows, including transmissions of measured data, of various vehicle sensors 13, 31, 40 to a control device 14 of the electric motor.

The measuring 102, 104 of data 103, 105 can also take place in each case only by means of sensors 11 within the electric motor or only by vehicle sensors 13, 23, 31, 41, 42.

In a further procedural step 110, the acquired measured data 103, 105 are converted, for example using a vehicle model. In this way, data 111 related to the electric motor 10 which, for example, comprise information about vehicle dynamics or a movement of the drive train, e.g. also about a rotor position, a rotational speed and/or a torque of the electric motor 10, can be ascertained.

In a further procedural step 120, the items of information 111 related to the electric motor 10 are evaluated using a control device 14 of the electric motor (see FIG. 3). In so doing, a machine model of the electric motor 10 and/or information about phase voltages and phase currents can be used, which can be ascertained in a procedural step 170. As a result of the evaluation, at least one first state variable 121 is determined, for example a rotor and/or a slip frequency of the electric motor 10. Pursuant to the first embodiment, at least one rotor angle 121 of the electric motor 10 is determined as at least one first state variable 121.

In a further procedural step 130, a sensorless method for determining at least one second state variable 131 is carried out. This can, for example, take place by means of a state observer or a pulse feed. By means of sensorless methods on the basis of the stator currents and stator voltages of the electric motor 10, a rotational speed of the electric motor 10 can be ascertained. According to the first embodiment, at least one rotor angle 131 is determined as a second state variable 131.

In a further procedural step 140, the first rotor angle 121 and the at least one second rotor angle 131 are compared with each other and an assessment of plausibility takes place. For example, a difference between the first rotor angle 121 and one of the second rotor angles 131 is calculated. If a plurality of second rotor angles 131 is present, differences between respectively the first rotor angle 121 and each of the second rotor angles can, for instance, be calculated. It is also possible to calculate differences between each rotor angle 121, 131 from the aggregate of the first and second rotor angles 121.

If at least one and/or all calculated differences exceed, for example, a limit value predetermined absolutely or relatively in relation to one or all rotor angles 121, 131, the presence of an error can be determined. In a further procedural step 180, an error signal can then be outputted. In order assess plausibility, further information, for example the measured data 103, 105 or the information 111 related to the electric motor and even additional information that has not yet been generated during the course of the inventive method can also be used.

When an error has been determined, further steps can take place, as, for example, an increase in measuring accuracies, for instance in the procedural steps when measuring 102, 104 the data 103, 105 and/or when ascertaining 130 the at least one second rotor angle 131.

In a further procedural step 150, a state variable correction value 141 is calculated, for example, by means of a weighted averaging calculation of the first and the second state variables 121, 131. In the simplest case, the weighted averaging calculation is an equally weighted averaging calculation. The weighting can, however, also depend on accuracy information which is predetermined or in each case currently determined about respectively the first and second state variables 121, 131; thus enabling one or a plurality of state variables 121, 131 to be even more strongly weighted during the averaging calculation as a function of how small the measuring inaccuracy for said state variable(s) is.

Provision can also be made for the weighting of the averaging to be able to change in the event of an error, for example an error in a certain error value range. Provision can also be made for at least one of the first and/or second state variables 121, 131 to not enter at all into the averaging calculation if, for instance, a particularly large error has been detected.

According to the first embodiment, the sensorless method using the determined state variable correction value 141 is supported and assessed for probability when the at least one second state variable 131 is ascertained. For example, a current operating point of the electric motor 10 can be determined on the basis of the determined state variable correction value 141.

When ascertaining 130 the at least one second state variable 131, a sensorless method to be used can then be selected from a plurality of specified sensorless methods. The selection of the sensorless method to be used can be based on a specified listing that specifies which method is to be used for each current operating point of the electric motor 10. Such sensorless methods can, for example, comprise the evaluation of a counter voltage induced by the electric motor 10, the feeding of a high-frequency auxiliary signal or the feeding of pulse patterns.

Figure 2:
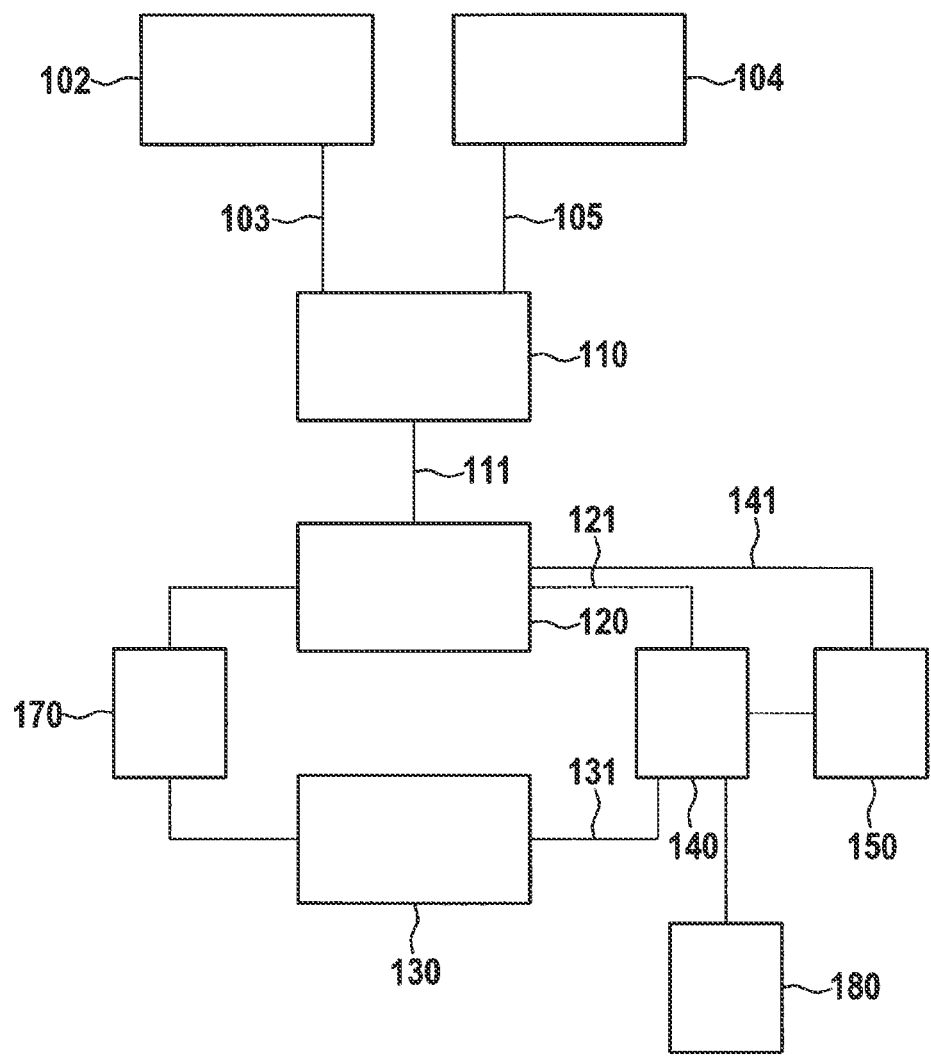
FIG. 2 shows a method for determining state variables of an electric motor for driving a motor vehicle pursuant to a second embodiment of the present invention.

FIG. 2 shows a method for determining state variables of an electric motor for driving a motor vehicle pursuant to a second embodiment of the present invention.

The method according to the second embodiment has substantially the same steps as the first embodiment. According to the second embodiment, the evaluation (120) of the data (111) related to the electric motor (10) is supported and assessed for plausibility using the determined state variable correction value (141).

FIG. 3 shows an inventive system for determining state variables of an electric motor for driving a motor vehicle pursuant to a third embodiment of the present invention.

The functions of the elements depicted in FIG. 3 have already in part been explained above in reference to FIGS. 1 and 2.

Pursuant to FIG. 3, two vehicle sensors 41, 42, in particular rotational speed sensors 41, 42, are mounted on two wheel axles 2, 2' of a motor vehicle in the proximity of the wheels 40. The rotational speed sensors 41, 42 can, for example, be designed as in the detailed explanation with regard to FIGS. 4a and 4b. The rotational speed sensors 41, 42 can also be components of a system for controlling driving dynamics (ESP) which is controlled by an ESP control device 24. The rotational speed sensors 41, 42 can, for example, be designed as a transmitter wheel 42 and a magnetic field sensor 41 as explained below in detail with a transmitter wheel 412 and a magnetic field sensor 404 in reference to FIG. 4a.

One of the wheel axles 2 is operatively connected via a transmission 30, which is controlled by a transmission control device 26, to a combustion engine 12 and an electric motor 10. In order to measure data 105, a vehicle sensor 31 is disposed on the transmission 30 and a vehicle sensor 13 on the combustion engine 12, wherein the vehicle sensors 13, 31 can especially be acceleration and/or rotational speed sensors.

A vehicle sensor 11, in particular a rotational speed sensor 11, is disposed on the electric motor 10 in order to measure data 103. The electric motor 10 and/or the combustion engine 12 can be controlled by an engine control device 22. A vehicle sensor 23, in particular an acceleration sensor 23, can be disposed in the engine control device 22.

All, alternatively however also only some, of the vehicle sensors 13, 23, 31, 41, 42 can be designed according to the invention. Further vehicle sensors can also be used on further components of the motor vehicle 1 that are not depicted.

FIG. 4a shows a schematic depiction of a device for measuring a rotational speed which can be used in the procedural step 102.

Pursuant to FIG. 4a, a transmitter wheel 212 is mounted on an axle 202, the rotational speed of which is to be measured in the procedural step 102, 104, coaxially with the axle 202. The axle 202 can correspond to one of the two axles 2, 2' in FIG. 3. The axle 202 can, however, also correspond to an axle that is operatively connected directly to the electric motor 10 or to an axle disposed in the transmission 30.

The transmitter wheel 212 has rectangular gear wheels 214 on the lateral surface thereof, which alternate with recesses 215 along the circumference of the lateral surface. A magnetic field sensor 404 comprising a permanent magnet 406 and a Hall element 408 is disposed on the metallic transmitter wheel 212 such that a magnetic field 410 generated by the permanent magnet 406 is changed by means of the movement of the gear wheels 414 in accordance with the rotation of the transmitter wheel 212 corresponding to the rotating axle 202.

The changes in the magnetic field 410 can be detected by the Hall element 408 and, for example in the procedural step 110, can be converted into a digital signal 416, as depicted in FIG. 4b, as a function of the rotor angle v.

FIG. 4b shows a schematic graph which describes a datum measured using the device depicted in FIG. 4a.

An exemplary digital signal 416 having a digital signal level 418 between logic Zero and logic One is depicted in FIG. 4b as a function of the rotor angle v of the axle 202, as, for example, said signal can be measured and/or converted by the device depicted in FIG. 4a. In addition, the rotational speed of the axle 202 can be ascertained from the digital signal 416, for instance using the periodicity of logic One.

In the procedural step 110, the rotational speed of the axle 202 can be converted into a rotational speed of an axle of the electric motor 10 using a vehicle model of the motor vehicle 1 which in this case comprises, for example, information about a transformation of the rotational speed of the axle 202, possibly by means of the transmission 30, into a motor rotational speed of the electric motor 10. The rotational speed of the axle of the electric motor 10 is a signal 111 relating to the electric motor 10. The rotational speed of the axle of the electric motor 10 can be evaluated directly as the first state variable 121 of the electric motor 10. Said rotational speed can, however, also be evaluated using the machine model of the electric motor 10 in order to determine one or a plurality of other variables as at least one first state variable 121.

Although the present invention was described above using preferred exemplary embodiments, said invention is not limited to them but can be modified in a variety of ways. In particular, the invention can be changed or modified in multiple ways without deviating from the core of the invention.

The invention claimed is:

1. A method for determining state variables of an electric motor for driving a motor vehicle, the method comprising:
measuring (102, 104), by at least one sensor, data (103, 105) which comprises information about a current state of vehicle components (10, 12, 30, 40), including a rotational speed, a rotor angle (v) and/or an acceleration of an axle (202);
converting (110), by an electric motor control device (14), the measured data (103, 105) into data (111) related to the electric motor (10) using a vehicle model of the motor vehicle (1), the vehicle model uses transformation information to convert a rotational speed of the axle (202) into a rotational speed of the axle of the electric motor (10) and/or to convert a rotor angle (v) of the axle (202) into a rotor angle of the electric motor (10);
evaluating (120), by the electric motor control device (14), the data (111) related to the electric motor (10) using a machine model of the electric motor (10) for determining at least one first state variable (121) of the electric motor (10);
determining (130), by the electric motor control device (14), at least one second state variable (131) of the electric motor (10) using a sensorless method;
comparing and assessing the probability (140) of the at least one first and the at least one second state variable (121, 131); and
calculating (150), by the electric motor control device (14), a state variable correction value (141) of the electric motor (10) using a weighted averaging of the at least one first and the at least one second state variables (121, 131).

2. The method according to claim 1, wherein the at least one first state variable (121), the at least one second state variable (131) and the state variable correction value (141) each comprise a rotor angle of the electric motor (10).

3. The method according to claim 1, wherein the at least one first state variable (121), the at least one second state variable (131) and the state variable correction value (141) each comprise a motor rotational speed of the electric motor (10).

4. The method according to claim 1, wherein the at least one first state variable (121), the at least one second state variable (131) and the state variable correction value (131) each comprise a slip frequency of the electric motor (10).

5. The method according to claim 1, wherein the evaluation (120) of the data (111) related to the electric motor (10) takes place using phase voltages and phase currents ascertained in a procedural step (170).

6. The method according to claim 1, wherein, when determining (130) the at least one second state variable (131), the sensorless method is supported and assessed for plausibility using the determined state variable correction value (141).

7. The method according to claim 1, wherein the evaluation (120) of the data (111) related to the electric motor (10) is supported and assessed for plausibility using the determined state variable correction value (141).

8. The method according to claim 1, further comprising displaying (160) of data (145) which at least comprise the state variable correction value (141).

9. The method according to claim 1, wherein, when determining (130) the at least one second state variable (131), the sensorless method to be used is selected from a plurality of specified sensorless methods;
wherein the selection of the sensorless method to be used is further based on a specified listing, which specifies which method is to be used for each current operating point of the electric motor (10); and
wherein the operating point of the electric motor (10) is determined on the basis of the at least one first state variable (121), the at least one second state variable (131) and/or the state variable correction value (141).

10. A system for determining state variables of an electric motor for driving a motor vehicle, the system comprising:
internal sensors (11) within the electric motor and/or vehicle sensors (13, 23, 31, 41, 42) disposed on the electric motor (10) or on vehicle components (10, 12, 30, 40) in the motor vehicle (1), which are configured to measure data (103, 105) that comprise information about a current state of the electric motor and/or the vehicle components (10, 12, 30, 40) including a rotational speed, a rotor angle (v) and/or an acceleration of an axle (202) of the motor vehicle (1);
an electric motor control device (14) disposed in the motor vehicle (1) which is designed to control the electric motor (10), to convert measured data (103, 105) into data (111) related to the electric motor (10) using a vehicle model of the motor vehicle (1) which comprises transformation information concerning a transformation of the rotational speed of the axle (202) into a rotational speed of an axle of the electric motor (10) and/or transformation information concerning a transformation of a rotor angle (v) of the axle (202) into a rotor angle of the electric motor (10), and converts a rotational speed of the axle (202) into a rotational speed of the axle of the electric motor (10) and/or a rotor angle (v) of the axle (202) into a rotor angle of the electric motor (10), to evaluate the data (111) related to the electric motor (10) using a machine model of the electric motor (10) for determining at least one first state variable (121) of the electric motor (10), to determine at least one second state variable (131) of the electric motor (10) using a sensorless method, to compare and assess for plausibility the at least one first and the at least one second state variable (121, 131) and to calculate a state variable correction value (141) of the electric motor (10) by means of a weighted averaging of the at least one first and the at least one second state variable (121, 131).

* * * * *